US 3,773,864
Patented Nov. 20, 1973

3,773,864
TRIARYL PHOSPHATES
James D. Sullivan, Webster Groves, Mo., assignor to Monsanto Company, St. Louis, Mo.
No Drawing. Filed Dec. 16, 1970, Ser. No. 98,877
Int. Cl. C07f 9/12; C09k 3/00; C10m 1/46
U.S. Cl. 260—966                                7 Claims

ABSTRACT OF THE DISCLOSURE

Organic phosphates of the structure

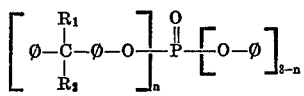

wherein $R_1$ is an alkyl of 1 to 13 carbon atoms, $R_2$ is an alkyl of 1 to 6 carbon atoms, and $n$ is a number of from 1 to 3. These compounds are thermally stable viscous liquids useful as functional fluids such as lubricants and hydraulic fluids, and as components of such fluids.

BACKGROUND OF THE INVENTION

Field of the invention

This invention relates to novel triaryl phosphates, and more particularly to substituted triphenyl phosphates wherein the substituent is a phenyl radical attached through a tertiary carbon atom.

Description of prior art

Phosphate esters have long been used as plasticizers, fungicides, flame retardants, lubricants, hydraulic fluids and the like. Neutral phosphate esters comprise three general classes of compounds: the trialkyl phosphates, the triaryl phosphates, and mixed alkyl-aryl phosphates. The triaryl phosphates, and alkyl substitued triaryl phosphates, are generally known for their good thermal stability, low vapor pressure, and low flammability. These generally favorable properties of the triaryl phosphates have prompted considerable research effort to develop specific compounds having improved properties desired for particular end uses. This effort has produced a wide variety of alkyl and aryl substituted triaryl phosphates which are disclosed in the art as being particularly useful as plasticizers, lubricants, fungicides, and the like.

Included among the known aryl substituted triaryl phosphates of the prior art are, for example, complex organic phosphates such as cumyl phenyl dialkylphenyl phosphates which are disclosed as flame retardants for fabrics, wood pulp, etc., and as plasticizers for cellulose ethers. These compounds are in most instances, however, extremely viscous liquids or non-crystalline resins at room temperature, and as such are not suited for use as functional fluids.

Also known are organic phosphates such as phenyl bis-(4-alpha-methylbenzylphenyl) phosphate. These compounds are well suited for use as plasticizers but lack the thermal stability and lubricity required for functional fluids.

The compounds of the present invention comprise a novel class of substituted triaryl phosphates which were found to be particularly adapted for use as functional fluids. Although the compositions of the present invention are closely related to many of the compositions of the prior art, they are distinguished from the prior art compositions by certain specific structural differences and by physical properties which make the compositions of this invention particularly well suited for use as functional fluids.

SUMMARY

It is accordingly an object of the present invention to provide novel organic phosphates which possess a unique combination of properties and are particularly well suited for use in functional fluid compositions. It is a further object of this invention to provide substituted triaryl phosphorus esters having good fire resistance, thermal stability and performance characteristics desirable for functional fluids.

These and other objects of this invention are accomplished by providing substituted triaryl phosphates of the structure:

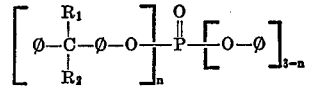

wherein $R_1$ is an alkyl of 1 to about 13 carbon atoms, $R_2$ is an alkyl of 1 to about 6 carbon atoms and $n$ is 1 to 3.

These compounds are viscous liquids at room temperature, are thermally stable with good oxidation resistance, and are particularly well suited for use as functional fluids or components of functional fluids in combination with other phosphate esters.

DESCRIPTION OF PREFERRED EMBODIMENTS

The triaryl phosphate esters of this invention are readily prepared using conventional methods known for the preparation of phosphate esters. It is known, for example, that alcohol esters of phosphoric acid can be prepared by reacting an alcohol or mixture of alcohols with phosphorus oxyhalide at temperatures of from about 0 to 300° C.

Accordingly, the triaryl phosphates of this invention can be prepared by reacting phenols and selected substituted phenols with phosphorus oxychloride in accordance with such known procedures and one or more of the following equations:

3RØOH+POCl$_3$→(RØO)$_3$PO+3HCl
2RØOH+ØOH+POCl$_3$→(RØO)$_2$PO(OØ)+3HCl
RØOH+(ØOH)$_2$+POCl$_3$→RØOPO(OØ)$_2$+3HCl

The compounds of this invention are preferably prepared in a two-stage reaction by first reacting a substituted phenol with a phosphorus oxyhalide to form a monoaryl phosphoric acid dihalide or a diaryl phosphoric acid monohalide, then completing the esterification with unsubstituted phenol. In such a system it is preferable, in preparing the intermediate aryl phosphoric acid halide, to employ the substituted phenol in a proportion slightly lower than that theoretically required since the yield of such intermediate product is generally highest when this is done. It is also desirable although not necessary to separate the desirable intermediate aryl phosphoric acid halide product by distillation or otherwise before reacting the same with the unsubstituted phenol since the desired triaryl phosphate product is thereby obtained in maximum yield and most readily purified form. After the formation of the triaryl phosphate is complete, hydrogen halide and other volatile impurities are removed from the hot reaction mixture by blowing with air or nitrogen, or by distillation under vacuum.

Alternatively, mixtures of triaryl phosphates may be prepared by heating a mixture of phenol and substituted phenol to reaction temperature. The reaction product obtained by this method comprises a mixture of triaryl phosphates of this invention and triphenyl phosphate.

The esterification is preferably conducted in the presence of a catalyst such as metallic calcium, magnesium or aluminum, or a chloride of magnesium, aluminum, iron or tin. The rate of reaction is of course dependent upon variables such as the particular reactants employed, the relative proportions of reactants, the presence or absence of a catalyst, etc. However, since the reaction is accompanied by evolution of hydrogen halide, the minimum reaction temperature can be defined as the temperature at which hydrogen halide gas is evolved. The reactions are preferably carried out at the lowest convenient reaction temperature, usually below 300° C. and preferably between 120°–220° C.

The phosphorus oxyhalide reactant can be phosphorus oxychloride, phosphorus oxybromide, or phosphorus oxyiodide, with phosphorus oxychloride being generally preferred.

The substituted phenols used in preparing the compounds of this invention are those described by the general structure

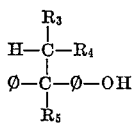

wherein $R_3$ and $R_4$ are H or alkyls of 1 to about 6 carbon atoms, and $R_5$ is an alkyl of 1 to about 6 carbon atoms. A particularly preferred substituted phenol of this structure is cumylphenol wherein $R_3$ and $R_4$ are hydrogen, and $R_5$ is methyl.

Cumylphenol can be prepared by the alkylation of phenol with dehydrated alpha-methylstyrene according to the following reaction:

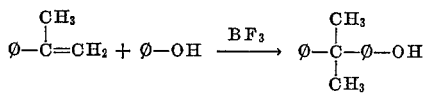

In the alkylation reaction, the dehydrated crude alpha-methylstyrene is added to phenol containing boron trifluoride etherate catalyst at 100° F. The mixture is held at about 100° F. for about 1 hour to complete the reaction, after which water is added to deactivate the catalyst. Excess phenol and other low boilers are removed by distillation, after which the cumylphenol is taken overhead as an intermediate cut. Cumylphenol has a refractive index at 78° C. of 1.5700±0.001.

Other substituted phenols useful in this invention which can be prepared according to the above procedure include the following:

(A) 2-phenyl-2-(4'-hydroxyphenyl)butane, by reaction of phenol with either alpha-ethylstyrene or 2-phenyl butene-2.

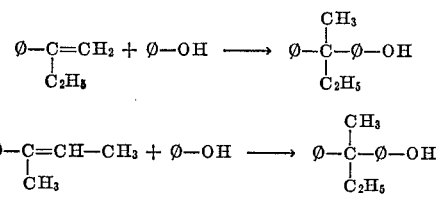

(B) 2-phenyl-2-(4'-hydroxyphenyl)pentane, by reaction of phenol with either alpha-n-propylstyrene or 2-phenyl pentane-2.

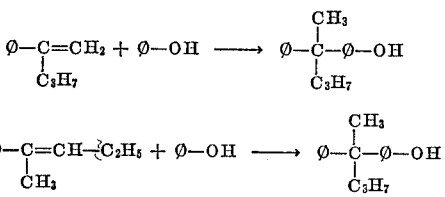

(C) 2-phenyl-2-(4'-hydroxyphenyl)hexane, by reaction of phenol with 2-phenyl hexene-1.

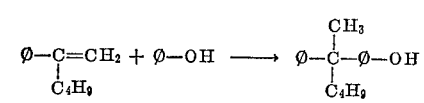

(D) 3-phenyl-3-(4'-hydroxyphenyl)hexane, by reaction of phenol with 3-phenyl hexene-3.

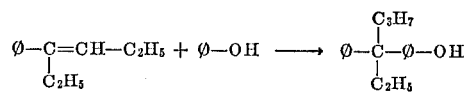

(E) 2-phenyl-2-(4' - hydroxyphenyl)-3-methyl butane, by reaction of phenol with 2-phenyl-3-methyl butene-2.

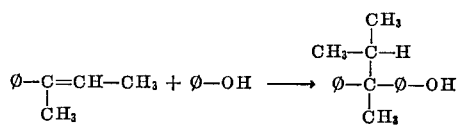

The following example is provided to illustrate the invention by describing the preparation of cumylphenyl diphenyl phosphate, a preferred triaryl phosphate of the present invention.

EXAMPLE

To a reactor, equipped with a stirrer and a refrigerated condensing system, is added 40.6 pounds of phosphorus oxychloride and 1.65 pounds of aluminum chloride. The slurry is heated to 100° C. and 56.2 pounds of molten cumylphenol is slowly added at a rate determined by the ability of the cooling system to condense the phosphorus oxychloride from the surging off-gas stream and return it to the reactor.

When the addition of the cumylphenol is complete the reaction is heated to 125° C. and held for one (1) hour. The pressure is then slowly reduced to 80–100 mm., and the batch held under minimum reflux for another hour. After this hold period the reactor is restored to atmospheric pressure and 54.8 pounds of phenol is slowly added at a rate determined by the capacity of the overhead system to handle the evolution of HCl. The reactor is maintained at 140° C. for one (1) hour, after which the pressure is reduced to 20–30 mm. and the temperature increased to 160° C. for another hour to complete the reaction.

The catalyst in the reaction mixture is then deactivated by the addition of 2.6 pounds of water. The batch is then made slightly alkaline to a pH of 8.8 by the addition of 50% caustic solution and held for one-half (½) hour while maintaining a temperature below about 30° C. The esterification reaction is completed during this alkaline hold period according to the Schotten-Baumann reaction by causing the salts of excess phenols to react with any residual chloridates. After the alkaline hold period the ester product is recovered by conventional washing and dehydration.

Physical properties of the cumylphenyl diphenyl phosphate product were determined to be as follows:

Density—1.192 g./cc. at 25° C.
Refractive index—1.580 at 25° C.
Viscosity—Approximately 160 centistokes at 100° F.
Autogenous ignition temperature—1000° F. (Cleveland Open Cup).

In a like manner following the procedure of the preceding example, di(cumylphenyl)phenyl phosphate is prepared by reacting 2 moles of cumylphenol and 1 mole of phenol per mole of phosphorus oxychloride, and tri(cumylphenyl) phosphate is prepared by reacting 3 moles of cumylphenol per mole of phosphorus oxychloride. Other substituted triaryl phosphates are prepared in a like manner by substituting other substituted phenols for cumylphenol in the preceding examples.

The preceding examples are provided by way of illustration only, and are not intended to be limiting of the invention. Other substituted phenols besides those specifically described will be apparent to those skilled in the art in view of this disclosure, and such are intended to be included within the scope of the invention.

The embodiments in which an exclusive property or privilege is claimed are defined as follows:

1. An organic phosphate of the structure

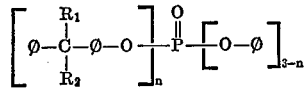

wherein $R_1$ is an alkyl of 1 to about 13 carbon atoms, $R_2$ is an alkyl of from 1 to about 6 carbon atoms, and $n$ is a number of from 1 to 3.

2. An organic phosphate of claim 1 wherein $n$ is 1.
3. An organic phosphate of claim 1 wherein $n$ is 2.
4. Cumylphenyl diphenyl phosphate.
5. Di(cumylphenyl)phenyl phosphate.
6. Tri(cumylphenyl) phosphate.
7. A composition of claim 1 wherein $R_1$ is

wherein $R_3$ and $R_4$ are H or alkyls of 1-6 carbon atoms.

References Cited
UNITED STATES PATENTS

| | | | |
|---|---|---|---|
| 3,428,714 | 2/1969 | Sconce et al. | 260—966 |
| 3,674,698 | 7/1972 | Weil | 260—966 X |

OTHER REFERENCES

Hackh's Chemical Dictionary, McGraw-Hill Book Company, New York (1969), p. 527.

ANTON H. SUTTO, Primary Examiner

U.S. Cl. X.R.

252—49.8, 78